(12) United States Patent
Chou et al.

(10) Patent No.: US 8,234,445 B2
(45) Date of Patent: Jul. 31, 2012

(54) RAID DATA PROTECTION ARCHITECTURE USING DATA PROTECTION INFORMATION

(75) Inventors: Ching-Hao Chou, Taipei (TW);
Chien-Hsin Chiang, Taipei Hsien (TW);
Ching-Hai Hung, Taipei Hsien (TW)

(73) Assignee: Infortrend Technology, Inc., Taipei Hsien (TW)

( * ) Notice: Subject to any disclaimer, the term of this patent is extended or adjusted under 35 U.S.C. 154(b) by 446 days.

(21) Appl. No.: 12/479,861

(22) Filed: Jun. 8, 2009

(65) Prior Publication Data

US 2010/0037022 A1 Feb. 11, 2010

Related U.S. Application Data

(60) Provisional application No. 61/059,813, filed on Jun. 9, 2008.

(51) Int. Cl.
*G06F 12/08* (2006.01)

(52) U.S. Cl. .................................... 711/114; 711/163

(58) Field of Classification Search .................. 711/114, 711/163
See application file for complete search history.

(56) References Cited

U.S. PATENT DOCUMENTS

2008/0244353 A1 * 10/2008 Dholakia et al. ............. 714/752

OTHER PUBLICATIONS

Article—"The mathematics of RAID6", H. Peter Anvin, Dec. 2004.
Article—"A Tutorial on Reed-Solomon Coding for Fault-Tolerance in RAID-like Systems", James S. Plank, Software-Practice & Experience, 27(9), pp. 995-1012, Sep. 1997.

\* cited by examiner

*Primary Examiner* — Jasmine Song
(74) *Attorney, Agent, or Firm* — CKC & Partners Co., Ltd.

(57) ABSTRACT

A structure of redundant array of independent disks (RAID) comprising multiple parity data is provided. A data protection field is attached after each basic data access unit of the parity data sequences and each subfields of the data protection field is defined according to different applications to protect the basic data access unit of the parity data or the data protection field of the payload data from errors incurring during data transmission.

27 Claims, 10 Drawing Sheets

RAID DATA PROTECTION ARCHITECTURE USING DATA PROTECTION INFORMATION

RELATED APPLICATIONS

This application claims priority to U.S. Provisional Application Ser. No. 61/059,813, filed Jun. 9, 2008, which is herein incorporated by reference.

BACKGROUND

1. Field of Invention

The present invention relates to a data protection architecture. More particularly, the present invention relates to a data protection architecture to protect the data in RAID with the use of data protection information.

2. Description of Related Art

Computer is an indispensable device in modern life. The data transmission and data storage are important in the computer technology. However, some errors may occur during the data transmission due to the hardware or software problems. Thus, it's an important issue to correctly detect the error during the data transmission. Thus, various check codes are applied to network communication, data access, data storage and data transmission technology.

Cyclic redundancy check (CRC) code technology is an error detection technology to detect accidental alteration of data during data transmission. The arithmetic process of the CRC is to treat the data about to transfer as a value composed of a plurality of continuous bits, and then to divide the value by a specific divisor in a binary form, wherein the divisor is termed a generation polynomial. The divisor is provided by the manufacturer of the hardware or the software. The number of the bits of the divisor depends on the number of the bits of the CRC needed. Some commonly used CRCs are CRC-8, CRC-16 and CRC-32 whose number of the bits are 8, 16 and 32, respectively. Usually, it's easier to detect errors when a longer CRC code is adapted. However, the longer CRC code is adapted, the longer time it takes to transfer the code. Theoretically, only one division operation is needed to calculate CRC. The remainder generated after the division operation is the CRC value. The CRC value is attached to the data packet and is sent to the target device as well. After the reception of the data packet, the target device performs an arithmetic operation with the same algorithm on the received packet to calculate a new CRC code. If the new CRC code is identical to the received CRC code, the received data is correct. If the new CRC code is different from the received CRC code, some errors are generated during the transmission. The data needs to be resent from the data-delivering end.

Though CRC error detection technology is widely adapted in various applications, it is only for the detection of the bit error caused by the hardware signal interference and is not able to deal with the data displacement error caused by the software.

Therefore, a standard called data protection information (DPI) is proposed to provide the data protection for end-to-end data transmission. Please refer to FIG. 1A and FIG. 1B. The DPI standard is to attach a data protection field 12 (e.g. an 8-byte field) after the basic data access unit 11 (e.g. a 512-byte field) of the conventional SCSI protocol. Thus, a new hybrid data chunk 10 (e.g. a 520-byte field) is generated. Take an example of an 8-byte data protection field 12, which can be separated into a 2-byte logical block guard subfield 121, a 2-byte logical block application tag subfield 122 and a 4-byte logical block reference tag subfield 123. The logical block guard subfield 121 is used to store the CRC code of the basic data access unit 11. The logical block reference tag subfield 123 is used to store the last 4 bytes of the logical block address (LBA) of data. The definition of the logical block application tag subfield 122 depends on different applications. Basically, the user can define both the logical block application tag subfield 122 and logical block reference tag subfield 123.

Though the DPI standard provides the data error detection for the end-to-end payload data transmission of the SCSI protocol, it doesn't define the data error detection for the parity data of the RAID system. However, the RAID system, especially the RAID system having the parity data, is the mainstream of the data storage system technology. Thus, what is needed is a structure of RAID system having multiple parity data to protect the check data of the parity data and/or the payload data with the DPI standard. The present invention addresses such a need.

SUMMARY

A structure of redundant array of independent disks (RAID) is provided. The structure of RAID comprises multiple parity data. By defining the content of the data protection information (DPI) of the parity data, the structure of RAID is able to protect the parity data or the DPI of the payload data from errors incurring during data transmission.

An object of the present invention is to provide a structure of redundant array of independent disks (RAID) comprising a redundant PSD array comprising a plurality of physical storage devices (PSDs), wherein the redundant PSD array is divided into a plurality of stripes each comprising a plurality of payload data chunks and a plurality of parity data chucks, so that the data of at least one basic data access unit of each of the plurality of payload data chunks which are inactive is able to be rebuilt by an arithmetic process performed on the plurality of parity data chunks and one or more the payload data chunks which are active, each of the plurality of parity data chunks and the plurality of payload data chunks comprising at least one basic data access unit and at least one data protection field, wherein for each of the payload data chunks, the data protection field is a first data protection field used to store data protection information comprising a logical block guard subfield, a logical block application tag subfield and a logical block reference tag subfield in order to protect the data in the basic data access unit of the payload data chunk, and for each of the parity data chunks, the data protection field is a second data protection field comprising a plurality of subfields, wherein different combinations of the subfields are used to store a plurality of check data sets in order to protect the data in the basic data access unit of the parity data chunk or in order to protect the data in the data protection field of the payload data chunk.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 3A and FIG. 3C together are the diagrams of the flow chart of the second embodiment to test if a set candidate value is a valid encryption key;

DETAILED DESCRIPTION

Figure 1A:
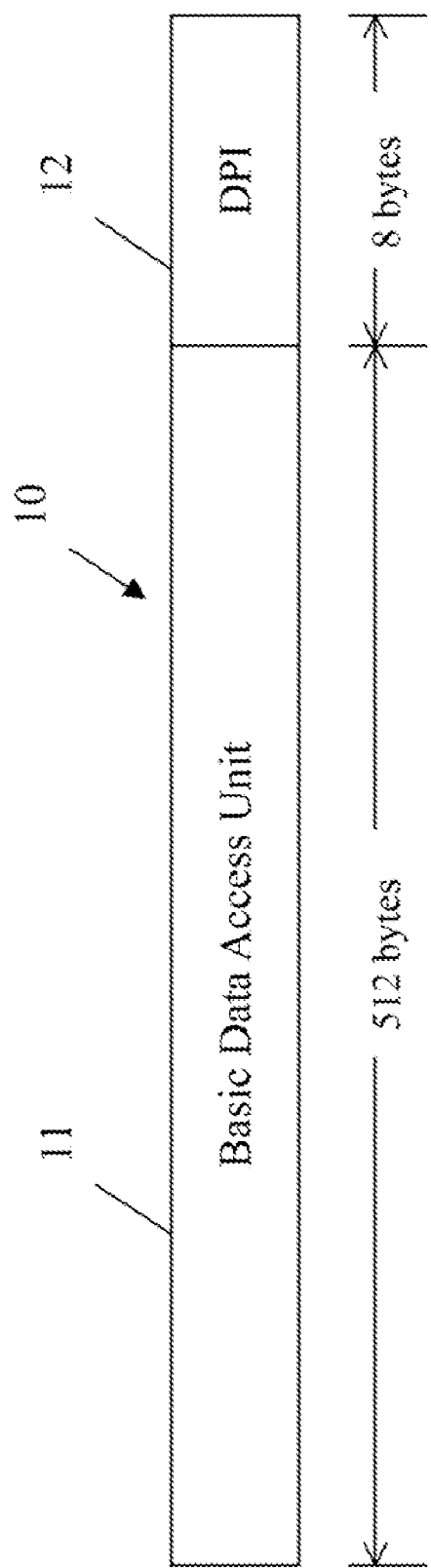
FIG. 1A is a diagram of the data protection information attached on the SCSI basic data access unit.
Figure 1B:
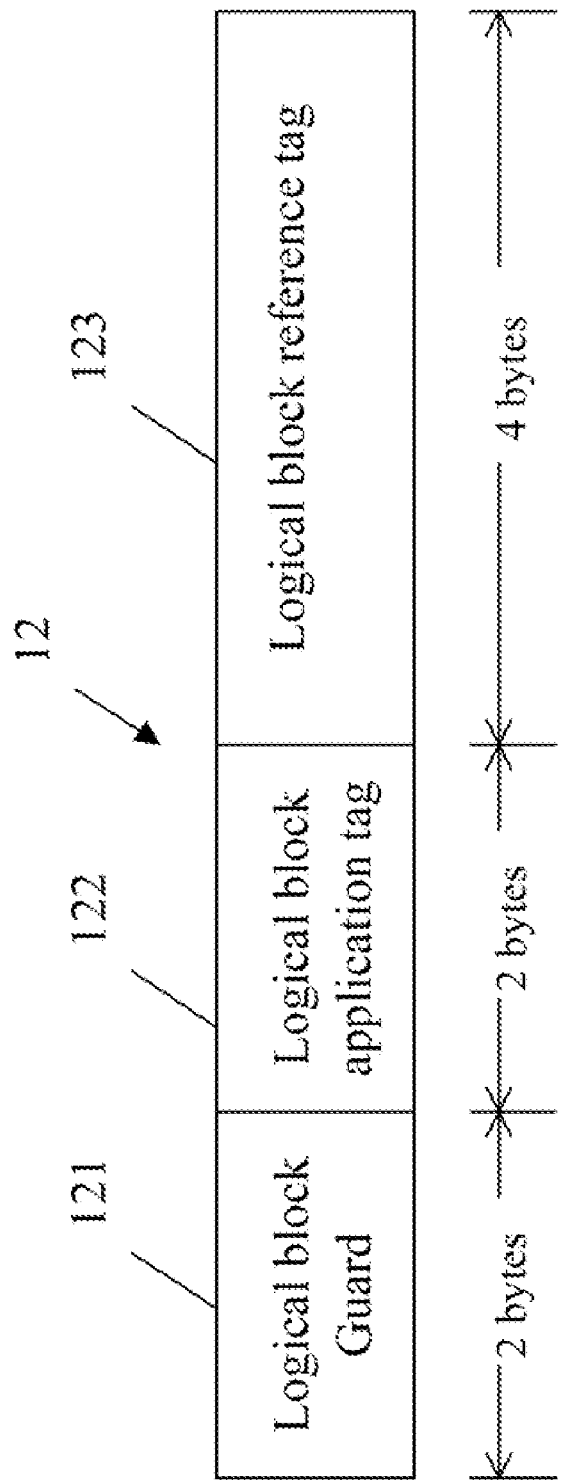
FIG. 1B is a diagram of the three different fields of the data protection information in FIG. 1A.

Reference will now be made in detail to the present embodiments of the invention, examples of which are illustrated in the accompanying drawings. Wherever possible, the same reference numbers are used in the drawings and the description to refer to the same or like parts.

The object of the present invention is to, in a structure of redundant array of independent disks (RAID) comprising multiple parity data, define the content of the data protection information (DPI) of the parity data, so as to protect the parity data or the DPI of the payload data to avoid errors incurring during the data transmission.

In different configurations of different systems, there can be one group, two groups or more than two groups of parity data stored in the RAID system. In the present embodiment, the RAID 6 is defined as a RAID system having two or more than two groups of parity data. Please refer to FIG. 2. Taking a RAID 6 system storing two groups of parity data as an example, the redundant physical storage device (PSD) array comprises five hard disk drives (HDDs), wherein three HDDs labeled as D0-D2 store the payload data and the other two labeled as P0 and P1 store the parity data. In other embodiments, the hard disk drives (HDDS) can be replaced by other physical storage devices such as, but not limited to, tapes, compact disc rewritable drives (CD-RNVs), digital versatile discs (DVDs)... etc. Though the system in the above example of FIG. 2 comprises three disks storing payload data and two disks storing parity data, in other embodiments the number of the disks can be different as long as the number of disks storing payload data and the number of disks storing parity data are both more than two. Also, it's noticed that in the above example of FIG. 2, the payload data and the parity data are separately stored in different specific disks. However, in other embodiments each disk is able to store the payload data and the parity data separately located in different storage stripes 20 of the same disk, as long as the data corresponding to the same stripe 20 of each disk is able to protect the payload data with the use of the parity data. Taking FIG. 2 as an example, a stripe 20 comprises three payload data blocks (or payload data chunks) D01-D21, a first parity data block (or a first parity data chunk) P01 and a second parity data block (or a second parity data chunk) P11. Thus, any two data sets in the payload data chunks D01, D11 and D21 that are inactive due to the malfunction of the disk or other reasons can be rebuilt by an arithmetic process performed on the first parity data chuck P01, the second parity data chuck P11 and part of the payload data chucks D01, D11 and D21.

Figure 2:
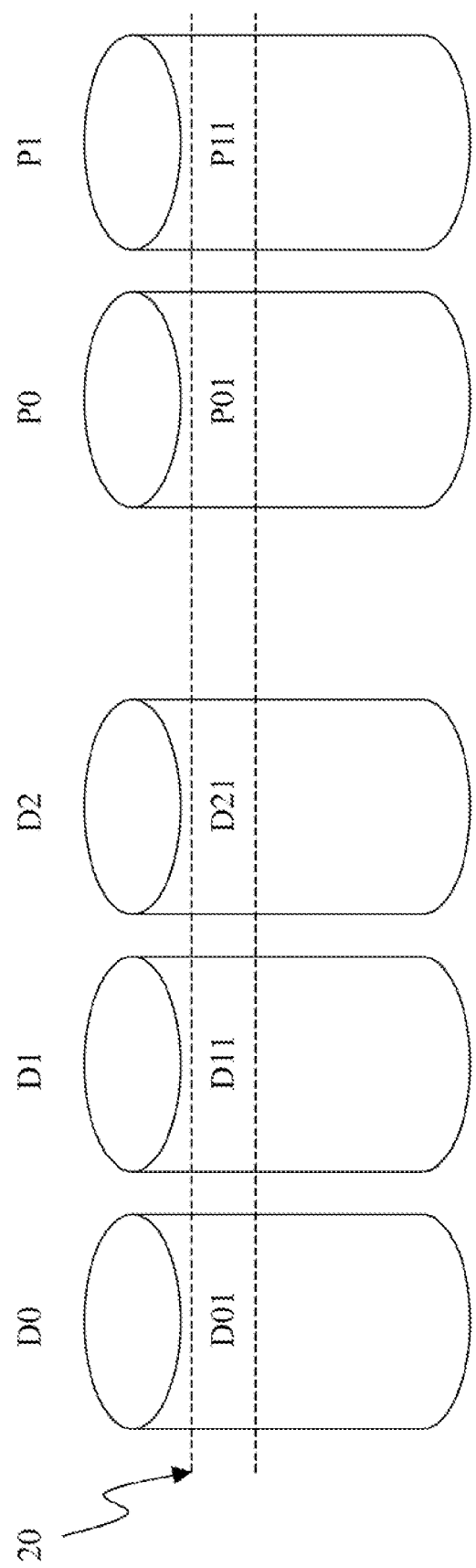
FIG. 2 is the diagram depicting the relation between the payload data and the parity data in a RAID 6 system having two parity data sets.

Taking FIG. 2 as an example, P01 and P11 can be calculated by the following equations:

$$P01 = a_0 \cdot D01 + a_1 \cdot D11 + a_2 \cdot D21 \quad (1)$$

$$P11 = b_0 \cdot D01 + b_1 \cdot D11 + b_2 \cdot D21 \quad (2)$$

The '+' symbol of the above equations stands for an XOR operation. P01 and P11 stand for the parity data sequences stored on the P0 disk and P1 disk respectively. D01, D11 and D21 stand for the payload data sequences stored on the D0 disk, D1 disk and D2 disk respectively. $(a_0, a_1, a_2)$ and $(b_0, b_1, b_2)$ stand for the operation coefficients respectively. Generally speaking, the operation coefficients $(a_0, a_1, a_2)$ for the first parity data P01 are set to 1, i.e. the equation (1) can be rewritten as:

$$P01 = D01 + D11 + D21 \quad (3)$$

Thus, only the XOR operation on the corresponding payload data is needed to calculate P01. If the RAID 6 system has data error or data damage due to the malfunction, or other reasons, of only one payload data disk drive, the equation (3) can be used to rebuild the wrong or damaged data. The process of the arithmetic operation of the equation (3) is well known to those skilled in the art, thus no further detail is described here.

The coefficients $(b_0, b_1, b_2)$ of the equation (2) cannot all be set to 1. The reason is that the linear dependency between the equation (2) and the equation (3) has to be maintained such that if two payload data disk drives malfunction or the data sets stored therein are damaged, the data sets of the two payload data disk drives can be restored by solving the two unknowns of the simultaneous equations (2) and (3). That means, no matter performing the calculation for P11 by the equation (2) or performing the inverse calculation for the damaged payload data D01, D11 and D21 by the same equation, both the calculation processes involve lots of multiplication operations. In order to make sure that the data of the disks can be restored by the calculation with only one solution to provide the reliability of the RAID system, the data on various payload data disks and the result of the multiplication operation must have a unique one-to-one corresponding relation. Besides, it is considerable that the result of the multiplication operation should have the same data length as the original data. Thus, the Reed-Solomon theory and Galois Field algebra are frequently adapted in most of the RAID 6 systems to deal with the arithmetic operations involving the second parity data.

According to the Reed-Solomon theory, $(2^0, 2^1, 2^2)$ is a set of valid coefficients of $(b_0, b_1, b_2)$. Thus, the equation (2) is rewritten as:

$$P11 = 2^0 \cdot D01 + 2^1 \cdot D11 + 2^2 \cdot D21 \quad (4)$$

The '+' symbol of the above equation stands for the XOR operation.

Moreover, according to another embodiment of the present invention, when a RAID 6 system has a third parity data P21, the P21 can be calculated according to an equation similar to the equations (1) and (2) (e.g. $P21 = c_0 \cdot D01 + c_1 \cdot D11 + c_2 \cdot D21$) as long as the coefficients $(c_0, c_1, c_2)$ are linear independent to the equations of other parity data (e.g. the equations (1) and (2)). The process to find out the appropriate coefficients $(c_0, c_1, c_2)$ according to the Reed-Solomon theory is well known to those skilled in the art, thus no further detail is described here.

After D01, D11 and D21 are multiplied by the coefficients, the result of the multiplication operation should have the same data length as the original data if considering actual data storing demand. For example, if the data length of one unit is 8 bits (1 byte), after performing the multiplication operation, the result must stay at the same length of 8 bits. It implies that an overflow issue incurred by the multiplication operation has to be taken care of.

Galois Field (GF) is a finite field whose algebraic rules have a characteristic as follows, the multiplication result of any two elements in the domain will fall within the same finite domain and, any two of the multiplication results of a fixed element and the other various elements in the domain are not the same. According to the characteristic above, a "specific value" is needed to deal with the overflow issue when the Galois Field is used for the multiplication operation. Furthermore, the result of the multiplication operation after dealing with the overflow by the "specific value" has to satisfy the requirement that each value of the multiplication results of a fixed element and the other various elements in the domain is unique.

Due to the characteristic of a finite field of the Galois Field, the specific value must be an element in the domain. Thus, by testing each element in the domain of the Galois Field can see if the element being tested to deal with the overflow is meet the requirement that each value of the multiplication results of a fixed element and the other various elements in the domain is unique. If the element can meet the requirement, the element being tested is proved to be the "specific value". For example, if the domain of the Galois Field is GF ($2^8$), [0, 1, 2, ..., 255] are the elements of the domain. Besides 0, each of the elements from 1 to 255 can be the candidate of the specific value. Thus, by performing a trial-and-error method on each element, a valid value (or valid values) in the domain of GF ($2^8$) can be found as the specific value.

The multiplication process can be performed by looking up a logarithmic table and/or an anti-logarithmic table (referred to as a table look-up method hereinafter). Taking the domain of GF ($2^8$) as an example, there are 16 elements that are proved to be the specific values able to deal with the overflow, as follows:

| | | | |
|---|---|---|---|
| 0x11d | 0x12d | 0x15f | 0x187 |
| 0x171 | 0x169 | 0x1f5 | 0x1c3 |
| 0x12b | 0x14d | 0x163 | 0x1cf |
| 0x1a9 | 0x165 | 0x18d | 0x1e7 |

The above values are represented in the hexadecimal form, wherein a "0x" symbol is put in front of each of the values indicating a hexadecimal number. For example, "0x11d" stands for a hexadecimal value of "11d" and its binary expression is "100011101", and the polynomial form can be represented as "$x^8+x^4+x^3+x^2+1$". The process to find out the 16 valid values is well known to those skilled in the art, thus no further detail is described here. The definition, characteristic and the arithmetic rules of the Galois Field can be found in the following references: (1) "The mathematics of RAID6", H. Peter Anvin, December, 2004; and (2) "A Tutorial on Reed-Solomon Coding for Fault-Tolerance in RAID-like Systems", James S. Plank, Software-Practice & Experience, 27(9), pp 995-1012, September, 1997.

If an add-and-shift method is adapted to deal with the multiplication operation, still a valid specific value is needed to work as the cardinal number to deal with the overflow, such that any two of the multiplication results of a fixed value and the other various values are not the same. Please refer to FIG. 3A and FIG. 3B, both of which together illustrate a first embodiment of the way to find out the valid "specific value".

Figure 3A:
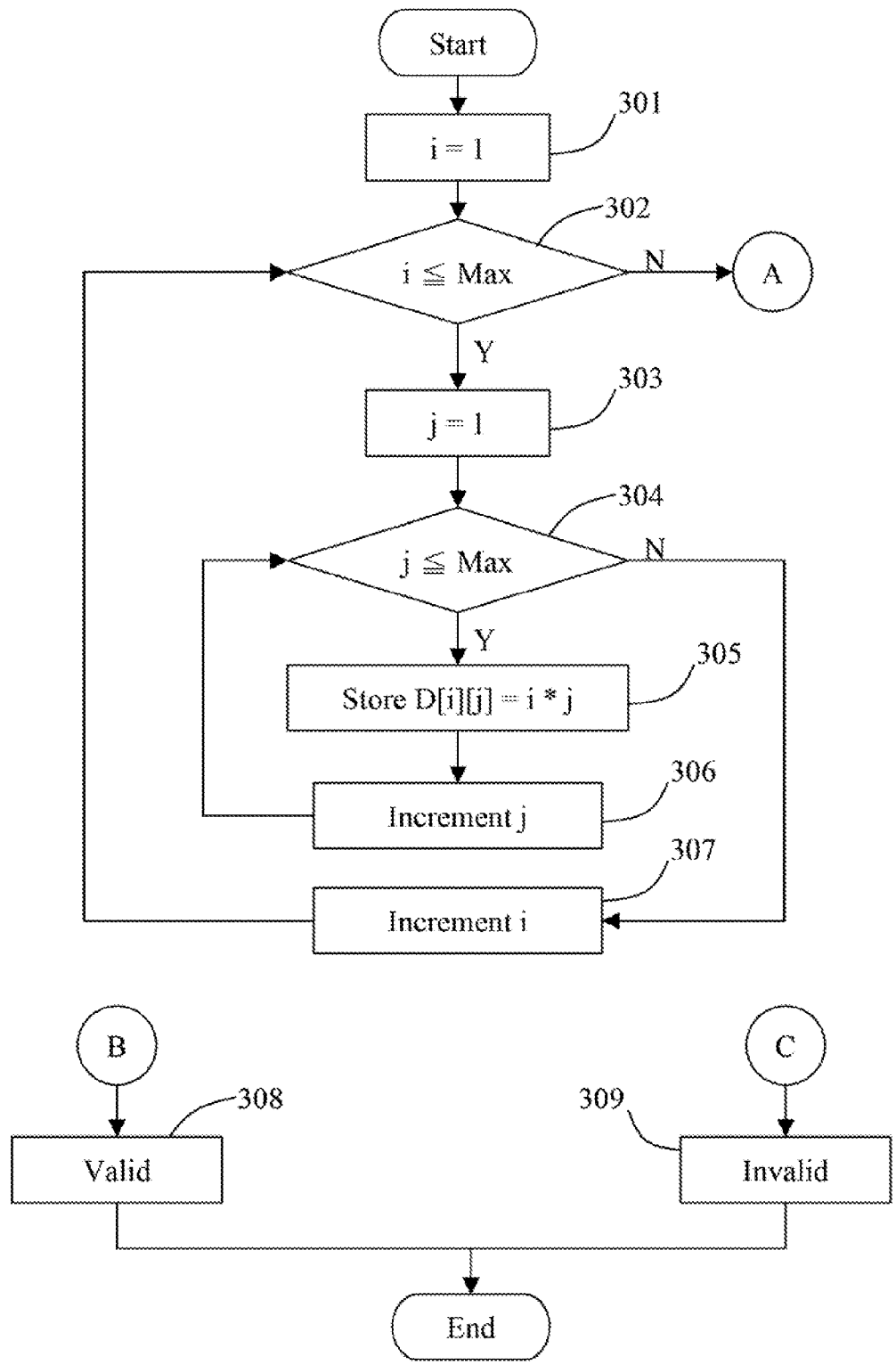
FIG. 3A and FIG. 3B together are the diagrams of the flow chart of the first embodiment to test if a set candidate value is a valid encryption key.

The steps 301 to 307 in FIG. 3A are the process to generate the products of any two elements in the domain according to the Galois Field multiplication rules with a prerequisite that a value in the domain is set to be the candidate of the specific value. The steps 310 to 323 in FIG. 3B constitute the process of performing comparisons on all the products generated in FIG. 3A according to a specific rule. The specific rule is to compare a product to all the other products on the same column or the same row. The above comparisons are for verifying that whether each of the products and its associated multiplicand (or multiplier) has a unique one-to-one corresponding relation when the multiplier (or multiplicand) is fixed. During the comparison process, if any two products are compared to be the same, the procedure turns to a node C to be back to FIG. 3A and the candidate being tested is labeled as invalid (step 309). If the comparisons for all the products are finished and none of any two of the products is the same, the procedure turns to a node B to be back to FIG. 3A and the candidate being tested is labeled as a valid value of the "specific value" (step 308). The detail description of FIG. 3A and FIG. 3B is shown in the following paragraphs.

Figure 3B:
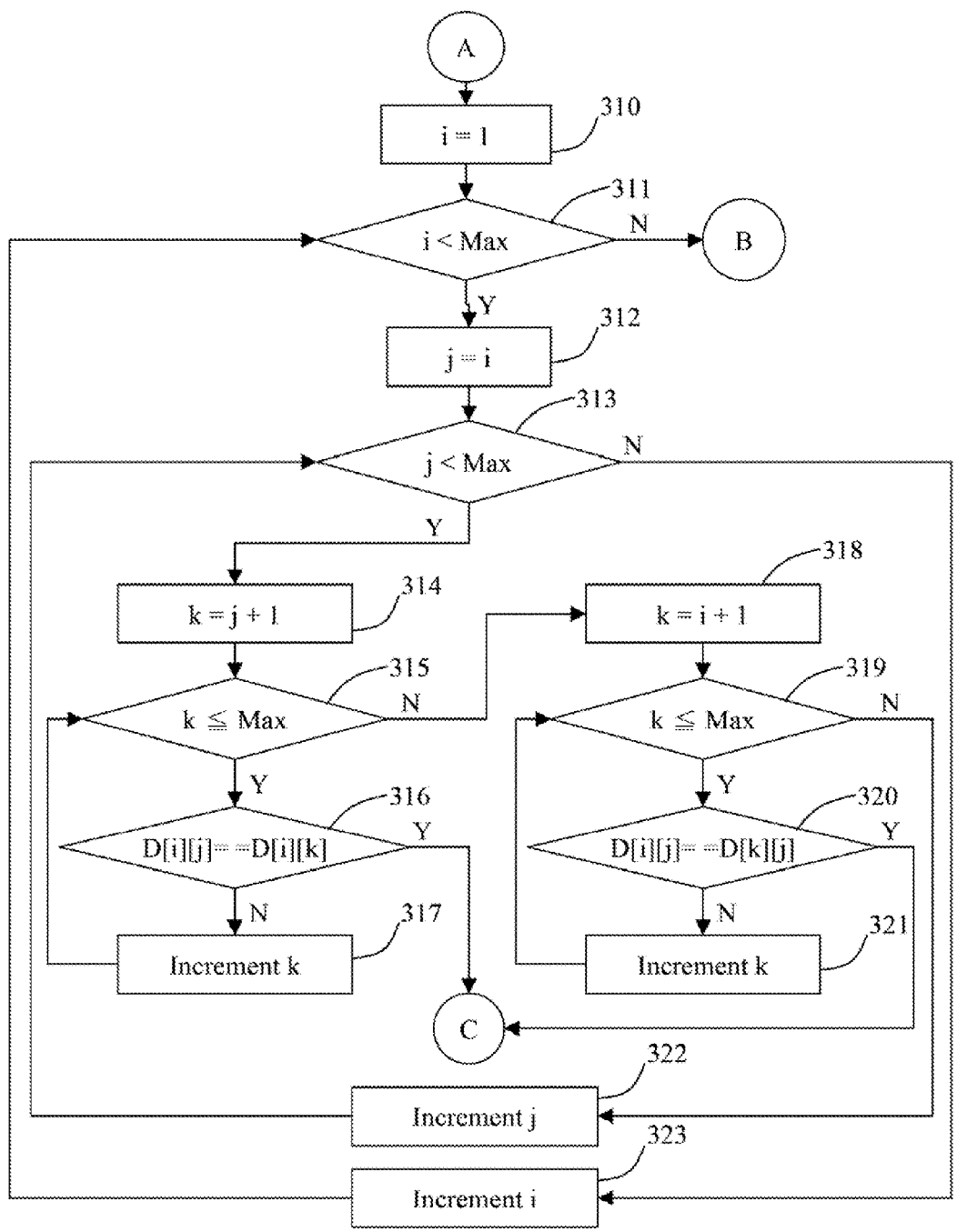

It's noticed that only one candidate is tested when the process of FIG. 3A and FIG. 3B is performed once. After finishing the test of one candidate based on the process of FIG. 3A and FIG. 3B, another element is chosen to be the candidate of the specific value and then the test process of FIG. 3A and FIG. 3B is performed again. After all elements, which can be the candidates, of the domain are tested by performing the test process repeatedly, those elements that are valid to be the "specific value" can be found for being used to deal with the multiplication operation related to the second parity data (e.g. P11) of the RAID system.

The procedure details of FIG. 3A is described as follows: in step 301, setting the multiplier i to 1; in step 302, checking whether the multiplier i is smaller than or equal to a predetermined maximum value (e.g. the maximum of is 255 if the domain is GF ($2^8$)). If the checking result of step 302 is yes, then step 303 is performed to set the multiplicand j to 1. If the checking result of step 302 is no, it means that all the products of any two elements of the domain are already generated and stored and then the procedure turns to a node A for performing the process in FIG. 3B. In step 304 after step 303 is performed, checking whether the multiplicand j is smaller than or equal to a predetermined maximum value of j (e.g. the maximum of i is 255 if the domain is GF ($2^8$)). If the checking result of step 304 is yes, then step 305 is performed. If the checking result of step 304 is no, it means that all the products of a fixed value of i and all possible values of j are generated and stored and then the procedure turns to the step 307 to add an increment of 1 to the value of i. In step 305, calculating i*j based on the algebraic rules of the Galois Field with the chosen candidate set as the specific value to deal with the overflow if happened and the product of i*j is given as an element of a matrix D[i][j] and is stored in a memory, wherein the element of D[i][j] is at the i-th row and j-th column of the matrix. In step 306, the value of j is increment of 1.

In short, the loop in steps 304-306 is to calculate the products of one fixed value of i and all possible values of j. The loop in step 302-307 is to calculate the products of all possible values of i and all possible values of j.

The procedure details of FIG. 3B is described as follows: in step 310, setting the value of i to 1; in step 311, checking whether the value of i is smaller than a predetermined maximum value (e.g. the maximum of i is 255 if the domain is GF ($2^8$)). If the checking result of step 311 is yes, then step 312 is performed to set the value of j equal to the value of i. In step 313, checking whether the value of j is smaller than a predetermined maximum value (e.g. the maximum of i is 255 if the domain is GF ($2^8$)). If the checking result of step 313 is yes, then step 314 is performed to set a variable k equal to j+1. Step 314 and the loop from step 315 to step 317 form the process to check whether the product stored in the element D[i][j] is the same with any of the products stored in elements D[i][k] on the same row while k>j. Wherein, step 315 is to check whether the value of k is smaller than or equal to a predetermined maximum value (e.g. the maximum of k is 255 if the domain is GF ($2^8$)). If the checking result of step 315 is yes, then step 316 is performed to determine whether D[i][k] is equal to D[i][j]. If the determining result of step 316 is yes, it means that at least two products are shown to be the same. Thus, the procedure turns to the node C to leave the process in FIG. 3B and be back to the process in FIG. 3A to label the candidate being tested as invalid. If the determining result of step 316 is no, step 317 is performed to add an increment of 1 to the value of k. The procedure is then back to step 315 for performing the next comparison of D[i][k] and D[i][j]. This comparison process is repeatedly performed until the value of k exceeds the predetermined maximum, and then step 318 is performed.

In step 318, setting the variable k equal to the value i+1. Step 318 and the loop from step 319 to step 321 is to check whether the product stored in the element D[i][j] is the same with any of the products stored in elements D[k][j] on the same column with k>i. Wherein, step 319 is to check whether the value of k is smaller than or equal to a predetermined maximum value (e.g. the maximum of k is 255 if the domain is GF ($2^8$)). If the checking result of step 319 is yes, then step 320 is performed to determine whether D[k][j] is equal to D[i][j]. If the determining result of step 320 is yes, it means that at least two products are the same. Thus, the procedure turns to the node C to leave the process in FIG. 3B and to back to the process in FIG. 3A for marking the chosen candidate as invalid. If the determining result of step 320 is no, the step 321 is performed to add an increment of 1 to the value of k. The procedure is then back to step 319 for performing the next comparison of D[k][j] and D[i][j] until the value of k is greater than the predetermined maximum, and then step 322 is performed.

In step 322, the value of j is increment of 1. Thus, the comparison basis of D[i][j] moves to the next column on the same row. The process of steps 313 to 321 is repeatedly performed until step 313 detects that j is greater than or equal to the maximum. When j is greater than or equal to the maximum, each of the D[i][j] on the same row has made the comparisons with the other associated elements on the same row or on the same column and, none of any two of the products is found to be the same. Then step 323 is performed to add an increment of 1 to the value of i (namely, moving to the next row) and repeatedly perform the above process (from step 311 to step 323). If the value of i reaches or exceeds the maximum in step 311 and none of any two of the products is compared to be the same (i.e. D[i][j]≠D[i][k] and D[i][j]≠D[k][j], when i, j<k≦Max), the procedure turns to the node B to leave the process in FIG. 3B and then be back to the process in FIG. 3A to label the candidate being tested as a valid value of the specific value.

Figure 3C:
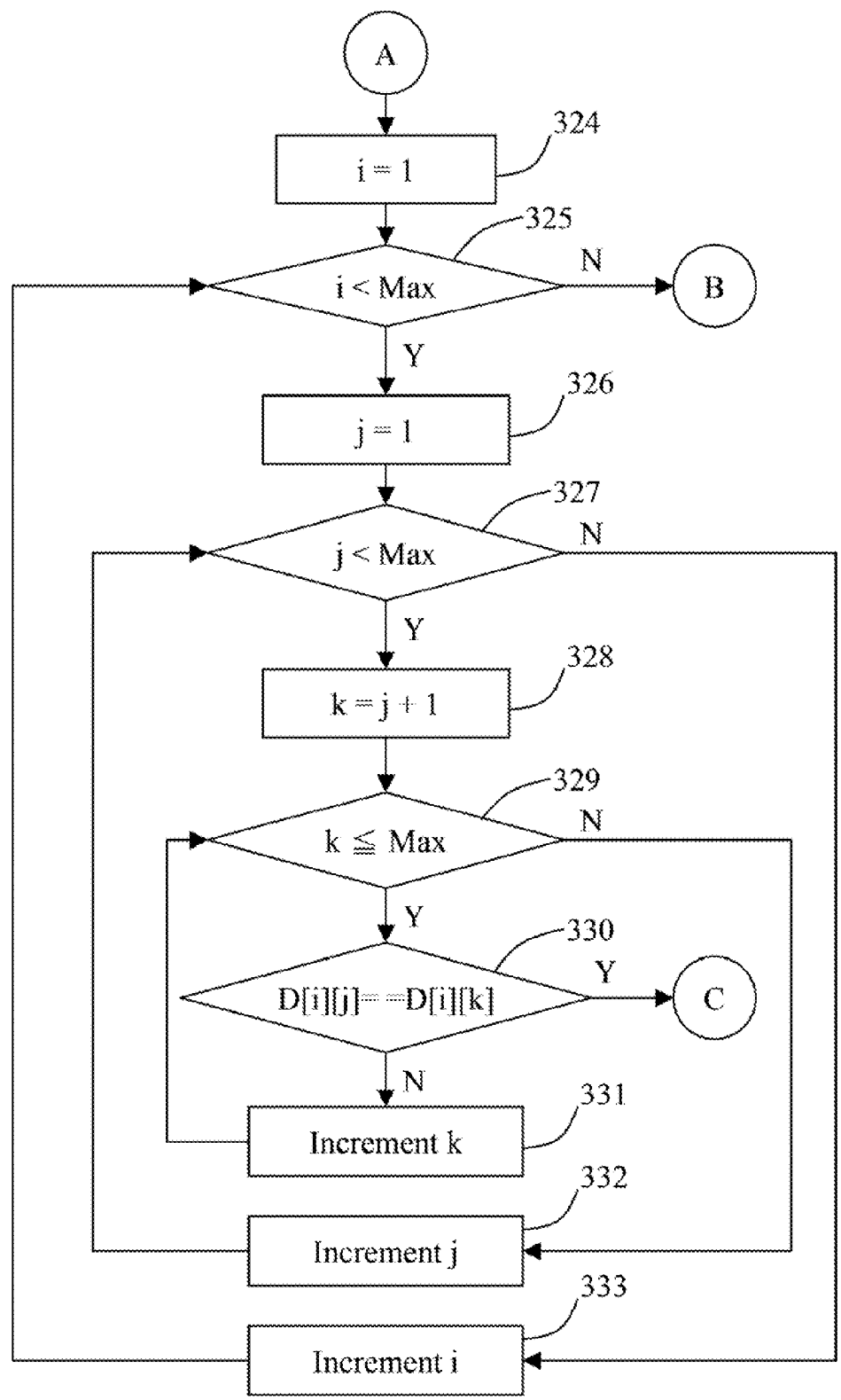

Please refer to FIG. 3A and FIG. 3C, both of which together is the second embodiment of the way to find out the valid "specific value". The steps 301 to 307 in FIG. 3A is the process to generate the products of any two elements in the domain according to the Galois Field multiplication rules with a prerequisite that a value in the domain is set to be the candidate of the specific value. The steps 324 to 333 in FIG. 3C constitute the process of performing comparisons on all the products generated in FIG. 3A according to a specific rule. The specific rule is to compare a product with all the other products on the same row. The above comparisons are for verifying that whether each of the products and its associated multiplicand has a unique one-to-one corresponding relation when the multiplier is fixed. In another embodiment of the present invention, the comparison process in FIG. 3C may be changed as comparing a product with all the other products on the same column. During the comparison process, if any two products are compared to be the same, the procedure turns to the node C to be back to FIG. 3A and the candidate being tested is labeled as invalid (step 309). If the comparisons for all the products are finished and none of any two of the products is the same, the procedure turns to the node B to be back to FIG. 3A and the candidate being tested is labeled as a valid value of the "specific value" (step 308). The detail description of FIG. 3A is already made in the above paragraphs and the detail description of FIG. 3C will be shown in the following paragraphs.

Similarly, only one candidate is tested when the process of FIG. 3A and FIG. 3C is performed once. After finishing the test of one candidate based on the process of FIG. 3A and FIG. 3C, another element in the domain is chosen to be the candidate of the specific value and then the test process in FIG. 3A and FIG. 3C is performed again. After all elements, which can be the candidates, of the domain are tested by performing the test process repeatedly, the elements that are valid to be the "specific value" can be found for being used to deal with the multiplication operation related to the second party data (e.g. P11) of the RAID system.

The procedure details of FIG. 3C is described as follows: in step 324, setting the value of i to 1; in step 325, checking whether the value of i is smaller than a predetermined maximum value (e.g. the maximum of i is 255 if the domain is GF ($2^8$)). If the checking result of step 325 is yes, then step 326 is performed to set the value of j equal to 1. In step 327, checking whether the value of j is smaller than a predetermined maximum value (e.g. the maximum of j is 255 if the domain is GF ($2^8$)). If the checking result of step 327 is yes, then step 328 is performed to set a variable k equal to j+1. Step 328 and the loop from step 329 to step 331 form the process to check whether the product stored in the element D[i][j] is the same with any of the products stored in the elements D[i][k] on the same row while k>j. Wherein, step 329 is to check whether the value of k is smaller than or equal to a predetermined maximum value (e.g. the maximum of k is 255 if the domain is GF ($2^8$)). If the checking result of step 329 is yes, step 330 is performed to determine whether D[i][k] is equal to D[i][j]. If the determining result of step 330 is yes, it means that at least two products are shown to be the same. Thus, the procedure turns to the node C to leave the process in FIG. 3C and be back to the process in FIG. 3A to label the candidate being tested as invalid. If the determining result of step 330 is no, then step 331 is performed to add an increment of 1 to the value of k. The procedure is then back to step 329 for performing the next comparison of D[i][k] and D[i][j]. This comparison process is repeatedly performed until the value of k exceeds the predetermined maximum in step 329, and then step 332 is performed.

In step 332, the value of j is increment of 1. Thus, the comparison basis of D[i][j] moves to the next column on the same row. The process of steps 327 to 332 is repeatedly performed until step 327 detects that j reaches or exceeds the predetermined maximum. When j reaches or exceeds the predetermined maximum, each of the D[i][j] on the same row has made the comparisons with the other associated elements on the same row and, none of any two of the products is found to be the same. Then step 333 is performed to add an increment of 1 to the value of i (namely, moving to the next row) and repeatedly performed the above process (from step 325 to step 333). If the value of i reaches or exceeds the predetermined maximum in step 325 and none of any two of the products is compared to be the same, it means that the comparison between each product of any two elements in the domain and the other associated products on the same row has been made and none of any two of the products is found to be the same. Then the procedure turns to the node B to leave the process in FIG. 3C and be back to the process in FIG. 3A to label the candidate being tested as valid.

It's noticed that the two procedures of FIG. 3B and FIG. 3C have the same object, which is to determine whether there are two products, each of which is a product of any two elements in the domain, being the same. The generation procedure of the products is according to FIG. 3A. Though there are some differences between the procedures of FIG. 3B and FIG. 3C, the substantial comparison effects are the same.

After the process of FIG. 3A grouped with FIG. 3B, or the process of FIG. 3A grouped with FIG. 3C, the valid specific values of the specific domain (e.g. GF ($2^8$)) are obtained. If the domain is GF ($2^8$), namely the data length is 8 bits, there are 30 valid specific values listed as follows:

| | | | | |
|---|---|---|---|---|
| 0x11b | 0x163 | 0x18d | 0x1cf | 0x11d |
| 0x165 | 0x19f | 0x1d7 | 0x12b | 0x169 |
| 0x1a3 | 0x1dd | 0x12d | 0x171 | 0x1a9 |
| 0x1e7 | 0x139 | 0x177 | 0x1b1 | 0x1f3 |
| 0x13f | 0x17b | 0x1bd | 0x1f5 | 0x14d |
| 0x187 | 0x1c3 | 0x1f9 | 0x15f | 0x18b |

The above 30 valid specific values are represented in the hexadecimal form, wherein a "0x" symbol is put in front of each of the values indicating a hexadecimal number. For example, "0x11d" stands for a hexadecimal value of "11d" and its binary expression is "100011101". With the specific values being proved to be valid, one can perform the multiplication operation related to the second parity data (such as P11) according to one of the valid specific values.

Please refer to the equations (2) and (3) again. According to the algebraic rules of the Galois Field and the multiplication operation related to the second parity data P11, power-of-2 numbers of ($2^0$, $2^1$, $2^2$) are often chosen as the coefficients of ($b_0$, $b_1$, $b_2$) as represented in the equation (4). If there are n numbers of payload data sequences taken into consideration, the equations (2) and (3) can be rewritten as follows:

$$P01 = D01 + D11 + D21 + \ldots + D(n-1)1 \quad (5)$$

$$P11 = 2^0 \cdot D01 + 2^1 \cdot D11 + 2^2 \cdot D21 + \ldots + 2^{n-1} \cdot D(n-1)1 \quad (6)$$

The "·" symbol in equation (6) stands for the multiplication operator of the Galois Field. The multiplication operations related to the second parity data described above can be: (1) calculating the second parity data (e.g. P11) by the substitution of the payload data sequences (e.g. D01, D11, D21, ..., D(n−1)1) into the equation (6); or (2) calculating a payload data set (e.g. D01) by the use of the second parity data set (e.g. P11) and the corresponding payload data sets (e.g. D01, D11, D21, ..., D(n−1)1); or (3) calculating two payload data sets (e.g. D01 and D11) by solving the simultaneous equations (5) and (6) according to the first and the second parity data sets (e.g. P01 and P11) and the corresponding payload data sets (e.g. D21, ..., D(n−1)1).

Figure 4:
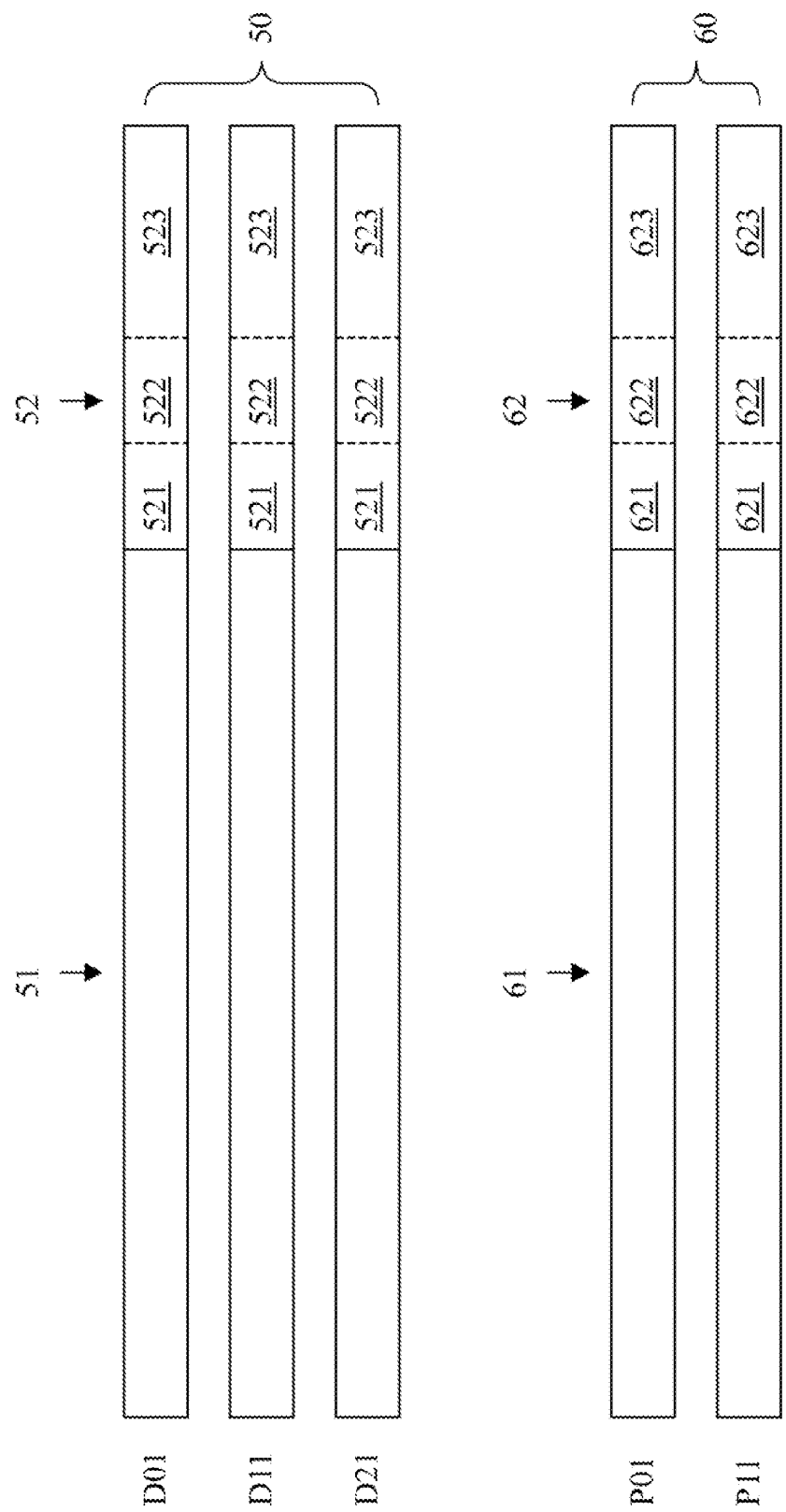
FIG. 4 is a diagram depicting the correspondence between the data chunks of the payload data and the data chunks of the parity data in the RAID 6 system having two parity data sets.

Please refer to FIG. 4. As compared with FIG. 2, each data sequence of D01, D11 and D21 in FIG. 4 is represented as a hybrid data chuck 50 and each data sequence of P01 and P11 is represented as a hybrid data chuck 60. Each of the hybrid data chunks 50 and 60 comprises a basic data access unit 51, 61 and a data protection field 52, 62 respectively. In an embodiment, the data length of the basic data access unit 51, 61 can be 512 bytes and the data length of the data protection field 52, 62 can be 8 bytes. However, the scope of the present invention is not limited in this embodiment. In other embodiments of the present invention, the data length of the basic data access unit 51, 61 and the data length of the data protection field 52, 62 can be other proper values. For example, in another embodiment, the data length of the basic data access unit 51, 61 can be 520 bytes. Though FIG. 4 takes three hybrid data chunks 50 representing the payload data sequences D01, D11, D21 and two hybrid data chunks 60 representing the parity data sequences P01, P11 as an example, it is not a limitation on the present invention. In another embodiments of the present invention, there can be different numbers, only if they are two or more than two, of payload data sequences and parity data sequences. The data protection field 52 of the hybrid data chunk 50 of each payload data sequences D01, D11, D2 is to protect the corresponding basic data access unit 51 from errors during data transmission. In the present embodiment, the data protection field after the basic data access unit 51 is termed as the first data protection field 52, which is used to store the data protection information (DPI). The specification of DPI used to protect the payload data is well known to those skilled in the art. For example, if the length of each the first data protection field 52 is 8 bytes, the first data protection field 52 would comprise a 2-byte logical block guard subfield 521, a 2-byte logical block application tag subfield 522 and a 4-byte logical block reference tag subfield 523. Wherein, the logical block guard subfield 521 is used to store the cyclic redundancy check code (CRC) obtained by calculating the basic data access unit 51. The logical block reference tag subfield 523 is used to store the last four bytes of the logical block address (LBA) of the basic data access unit 51. The definition of the logical block application tag subfield 522 depends on different applications.

The conventional RAID system either has no DPI to protect the parity data or just consider the protection on one parity data set (e.g. P01) during data transmission. RAID 5 system is such a system. The present invention focuses on the RAID system with two or more than two parity data sets (RAID 6 according to the definition of the present invention) to provide a second data protection field 62 similar to the DPI to make sure that no error occurs during the data transmission. In the present invention, the data protection field (termed as the second data protection field 62 hereinafter) of the parity data (e.g. P01, P11) comprises three subfields 621, 622 and 623 according to different requirements of data protection. The data stored in the three subfields 621, 622 and 623 may be varied and thus different from the data stored in the three subfields 521, 522 and 523 of the first data protection field 52. However, the format of the second data protection field 62 is similar to the one of the first data protection field 52, both of which are used to store the check data. For example, if the data length of each second data protection field 62 is 8 bytes, the second data protection field 62 would comprise a 2-byte first subfield 621, a 2-byte second subfield 622 and a 4-byte third subfield 623. A plurality of embodiments are provided in the following paragraphs to describe how to make use of the subfields 621, 622 and 623 of the second data protection field 62 to accomplish data protection mechanism in the RAID 6 system.

Figure 5A:
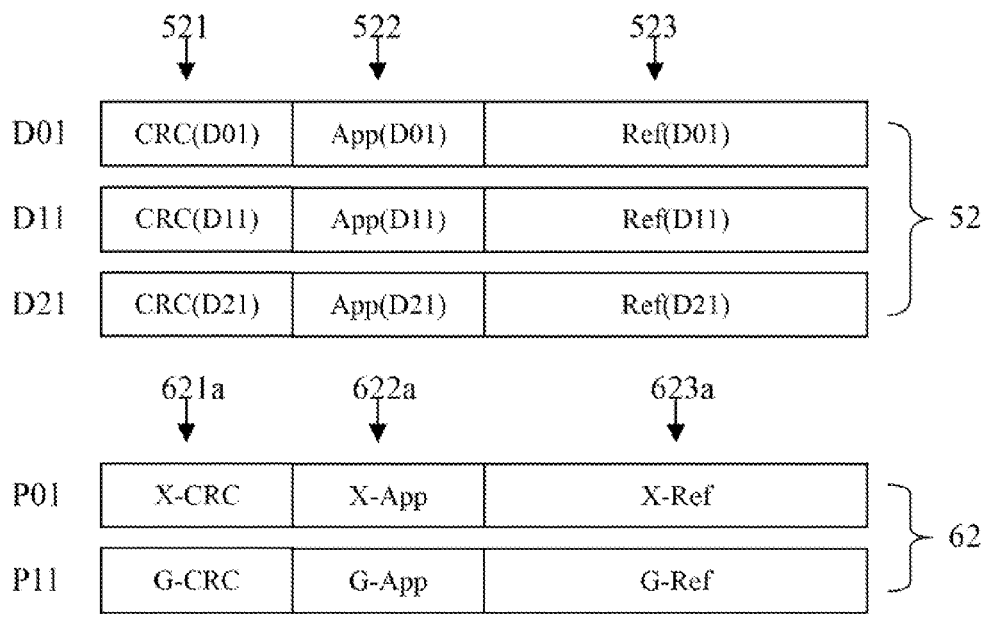
FIG. 5A to FIG. 5F are the diagrams respectively depicting six embodiments of the data protection mechanisms associated with the use of DPI data chunks in the RAID 6 system of the present invention.

Please refer to FIG. 5A, which illustrates the first embodiment of the content stored in the subfields 621, 622 and 623 of the second data protection field 62 of the parity data sets (e.g. P01, P11). The illustration in FIG. 5A only focuses on the corresponding relation between the first data protection field 52 of the payload data and the second protection field 62 of the parity data (the same in FIG. 5B to FIG. 5F). The definition of the basic data access unit 51 and 61 is the same as the conventional technology, thus no further detail is described here.

In order to make a clear description of the six embodiments depicted in FIG. 5A to FIG. 5F, the definitions of the symbols of each field in each figure are described as follows:

1. CRC(D01)~CRC(D21), App(D01)~App(D21), Ref (D01)~Ref(D21): generally termed as the first check data, wherein each group of the fields stands for the cyclic redundancy check code ("CRC" in the figures), the logical block application tag ("App" in the figures) and the logical block reference tag ("Ref" in the figures) respectively obtained by the arithmetic operations performed on or the corresponding relation of the basic data access unit 51 of the payload data D01, D11 and D21 according to the standard of data protect information (DPI). For example, CRC(D01) stands for the CRC obtained by calculating the basic data access unit 51 of the payload data D01 and it is used to protect the basic data access unit 51 of the payload data D01 from errors during the data transmission. Ref(D01) stands for the logical block reference tag (Ref) corresponding to the basic data access unit 51 of the payload data D01 and it is used to protect the basic data access unit 51 of the payload data D01 from LBA (logical block address) errors during the data transmission. The content of the logical block reference tag (Ref) is directly obtained or calculated from the LBA of the host command.

2. X-CRC, X-App, X-Ref: generally termed as the second check data, which are the first parity data obtained by performing calculation, according to the XOR operations of the equation (5), on the corresponding subfields 521, 522 and 523 of the first data protection field 52 of the payload data D01, D11 and D21 respectively. X-CRC, X-App and X-Ref are stored in the subfield 621a, 622a and 623a of the second data protection field 62 of the first parity data P01 respectively. For example, X-CRC=CRC(D01)+CRC(D11)+CRC(D21), wherein "+" stands for an XOR operation. This calculation result is stored in the first subfield 621a, 621b and 621d in FIG. 5A, FIG. 5B and FIG. 5D, in the first half of the third subfield 623c in FIG. 5C and in the second subfield 622e and 622f in FIG. 5E and FIG. 5F respectively.

3. G-CRC, G-App, G-Ref: generally termed as the third check data, which are the second parity data obtained by performing calculation, according to the Galois Field multiplication and XOR operations of the equation (6), on the corresponding subfield 521, 522 and 523 of the first data protection field 52 of the payload data D01, D11 and D21 respectively. G-CRC, G-App and G-Ref are stored in the subfield 621a, 622a and 623a of the second data protection field 62 of the second parity data P11 respectively. For example, G-CRC=$2^0 \cdot$CRC(D01)+$2^1 \cdot$CRC(D11)+$2^2 \cdot$CRC(D21), wherein "·" stands for a Galois Field multiplication and "+" stands for an XOR operation. This calculation result is stored in the first subfield 621a, 621b and 621d in FIG. 5A, FIG. 5B and FIG. 5D, in the first half of the third subfield 623c in FIG. 5C and in the second subfield 622e and 622f in FIG. 5E and FIG. 5F respectively.

4. TX-Ref and TG-Ref: the logical block reference tags (Ref) of the first and the second parity data which are obtained by truncating the 4-byte X-Ref and G-Ref in order to be fitted in the partial storage space of the third subfields 623c and 623d respectively, wherein the other part of the third subfields 623c and 623d are shared to store the other data. In an embodiment, TX-Ref and TG-Ref are obtained by truncating the first two bytes of the 4-byte X-Ref and G-Ref respectively. In another embodiment, TX-Ref and TG-Ref are obtained by truncating the last two bytes of the 4-byte X-Ref and G-Ref respectively.

5. CRC(P01) and CRC(P11): generally termed as the fourth check data, which are the CRC obtained by calculating the basic data access unit 61 of the parity data P01 and P11.

6. Ref(P01) and Ref(P11): belonging to the fourth check data as well, which are the logical block reference tags (Refs) obtained from the basic data access unit 61 of the parity data P01 and P11. The logical block reference tags (Refs) are used to store the LBAs of the physical storage devices (PSDs) corresponding to the basic data access unit 61 of the parity data P01 and P11. The Ref(P01) and Ref(P11) of the parity data P01 and P11 are the data storage addresses calculated by the controller according to the RAID configuration and are different from Ref(D01) to Ref(D21).

Please refer to FIG. 5A. According to the above definitions, the subfields 621a, 622a and 623a of the second data protection field 62 of the parity data P01 and P02 in the figure are used to store the results of the calculation according to the subfields 521, 522 and 523 of the first data protection field 52 of the payload data D01, D11 and D21. Please refer to FIG. 4 at the same time. The calculation of the second data protection field 62 is the same as the calculation of the basic data access unit 61, i.e. by calculating the corresponding data stored on the same stripe 20 according to the equations (5) and (6).

The advantage of the first embodiment illustrated in FIG. 5A is to provide the first data protection field 52 of the payload data D01, D02 and D03 a complete RAID function. If the data of any subfield 521, 522 and 523 is lost, the recovery can be made rapidly by the use of the corresponding subfields 621a, 622a and 623a of the second data protection field 62 of the parity data P01 and P11. Moreover, The calculation of this data recovery mechanism is the same as the calculation of the original basic data access unit 51 and 61. However, the first embodiment is not perfect. For example, there is no DPI protection on the basic data access unit 61 of the parity data P01 and P11 during the actual data read/write process from/to PSDs. Thus, it is unable to detect the errors of the parity data P01 and P11 during the data read/write process. It's hard to instantly discover the incorrect recovery results if the recovery of the payload data D01, D11 and D21 is performed according to the wrong parity data P01 and P11.

Figure 5B:
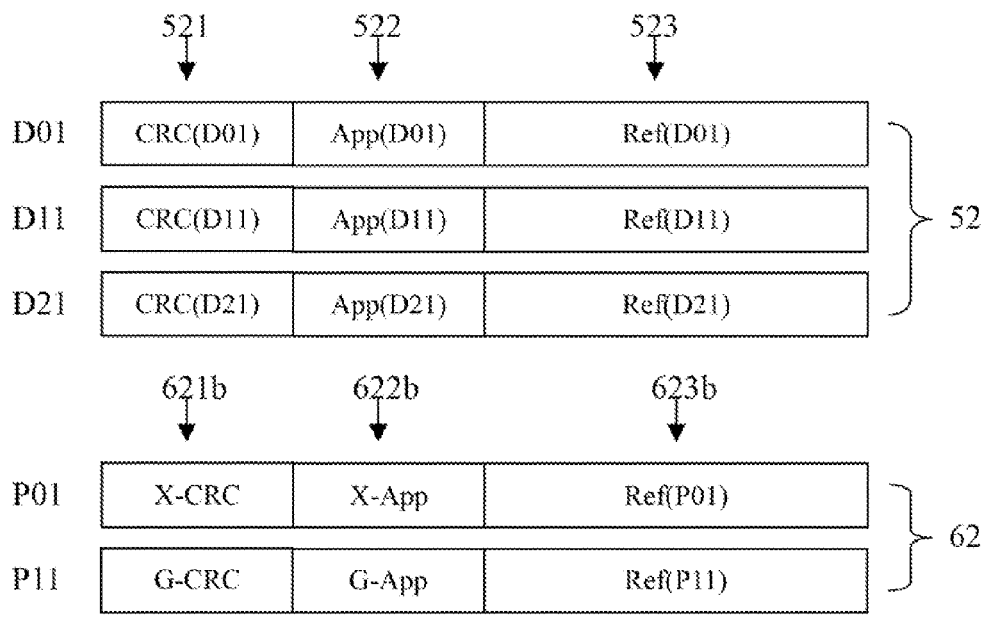

In the second embodiment shown in FIG. 5B, the third subfields 623b of the second data protection fields 62 of the parity data P01 and P11 are to store the logical block reference tags (Ref) obtained from the basic data access units 61 of the parity data P01 and P11, represented as Ref(P01) and Ref(P11) respectively. The calculation of the first subfield 621b and the second subfield 622b of the second data protection field 62 is the same as the calculation described in FIG. 5A. The present embodiment, compared with the first embodiment shown in FIG. 5A, provides a protection of the logical block reference tags (Ref) on the basic data access unit 61 of the parity data P01 and P11 during the data transmission on the drive side. However, if an error, data damage or data lost occurs on the third subfield 523 of the first data protection field 52 of the payload data D01, D11 and D21, the recovery for the damage or lost data can not be made by using the RAID mechanism. The first and the second subfields 621b and 622b of the second data protection field 62 of the parity data P01 and P11 have the same implementation as those described in FIG. 5A. Thus, the characteristics are the same as well.

In short, the first embodiment of FIG. 5A defines the second data protection field 62 of the parity data P01 and P11 as one able to provide a complete RAID protection mechanism on the first data protection field 52 of the payload data D01, D11 and D21. However, it is unable to detect the errors of the basic data access unit 61 of the parity data P01 and P11 occurring during the data transmission on the drive side. The second embodiment of FIG. 5B trades the RAID protection on the logical block reference tags (Ref) 523 of the payload data D01, D11 and D21 for a protection on the LBAs of the basic data access units 61 of the parity data P01 and P11 so as to make sure the correctness of the LBAs. However, it still provides no CRC protection on the basic data access units 61 of the parity data P01 and P11.

Figure 5C:
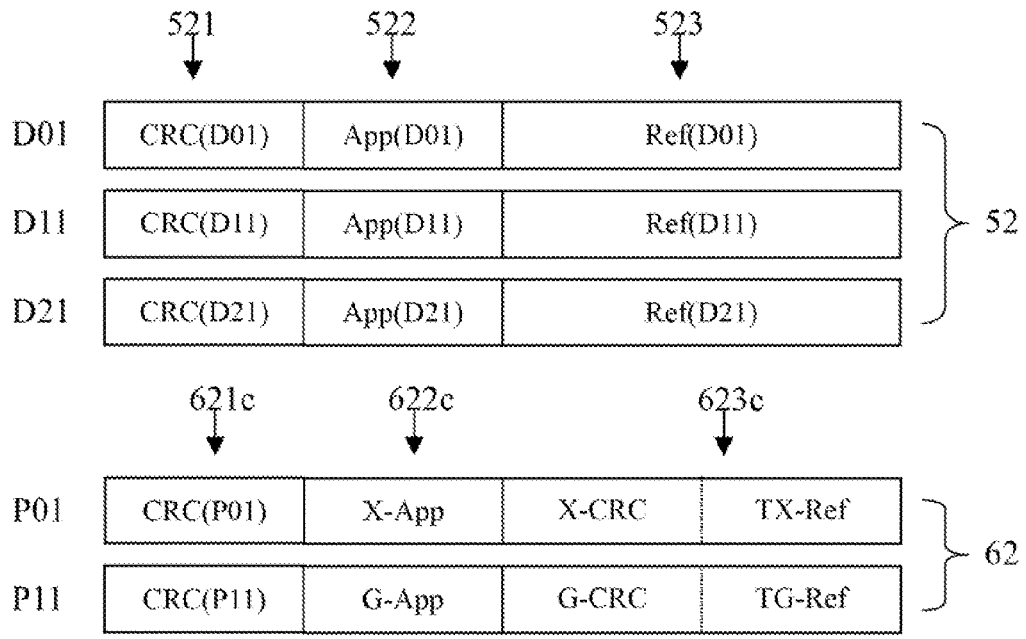
Figure 5D:
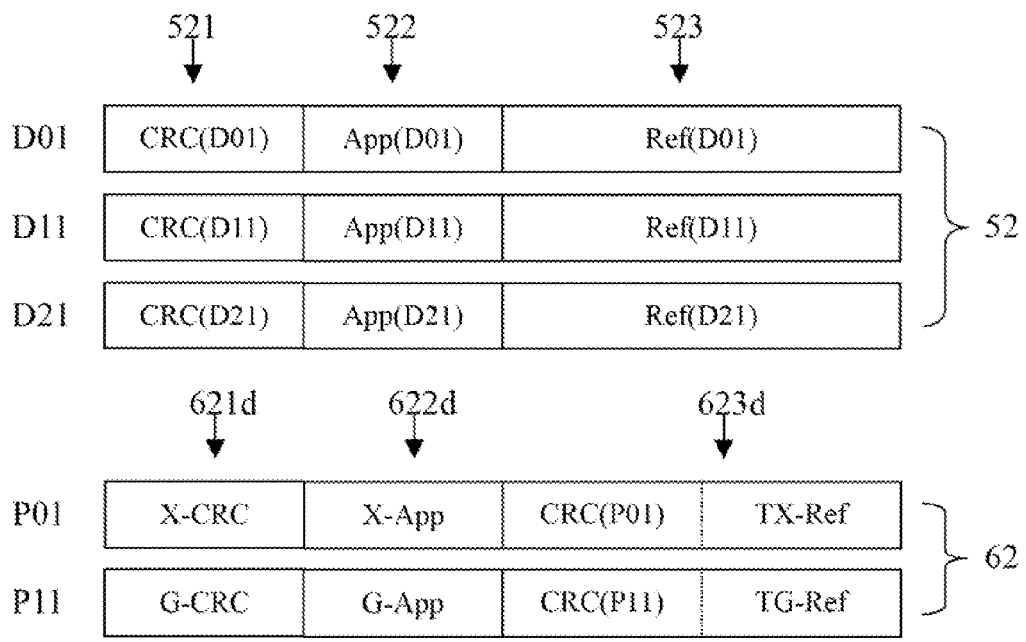

Considering more data protection provided by the second data protection field 62 of the parity data P01 and P11, the 4-byte third subfields 623c and 623d are further divided into two 2-byte spaces respectively in FIG. 5C and FIG. 5D. The first two-byte space is used to store the truncated X-Ref and G-Ref, represented as TX-Ref and TG-Ref respectively. The second two-byte space is used to co-work with the first subfields 621c and 621d for storing the check data of CRC(P01), CRC(P11) or the check data of X-CRC, G-CRC. Actually, the truncated logical block reference tags of TX-Ref and TG-Ref are only able to provide the recovery of half of the content of the logical block reference tags (Ref) 523. However, the LBA of transmitted data can be deduced from some other ways such as the program logic so that the TX-Ref and TG-Ref are still able to provide an auxiliary verification.

By dividing the space of the third subfields 623c and 623d, one more set of check data (e.g. CRC(P01), CRC(P11) or X-CRC, G-CRC) can be stored according to the third and the fourth embodiments shown in FIG. 5C and FIG. 5D. Thus, the basic data access unit 61 of the parity data P01 and P11 has the CRC protection (through CRC(P01), CRC(P11)) during the data transmission on the drive side. Also, the CRC 521 of the first data protection field 52 of the payload data D01, D11 and D21 can be recovered by the RAID function (through X-CRC, G-CRC). However, the present embodiments are not perfect either. First, the LBA of the basic data access unit 61 of the parity data P01 and P11 still has no DPI protection (e.g. not storing the transmission address in the third subfield 623 like some other embodiments). Second, though the basic data access unit 61 of the parity data P01 and P11 has CRC protection during the data transmission on the drive side in the fourth embodiment illustrated in FIG. 5D, this implementation that the CRC(P01) and CRC(P11) are stored in the partial space of the third field 623d is different from the well-known standard of the DPI. More specifically, the data offset of the CRC is incompatible with the standard DPI format. Thus, additional software and hardware are needed because in this embodiment conventional DPI chips are not able to detect CRC(P01) and CRC(P11).

In some situations, it is allowed that the logical block application tag (App) of the DPI is modified or even lost. By taking advantage of the above characteristics, in the fifth and sixth embodiments of FIG. 5E and FIG. 5F, the second subfields 622e and 622f of the second data protection field 62 of the parity data P01 and P02 are used to store the X-CRC and G-CRC so as to provide the RAID data recovery mechanism on the CRC 521 of the first data protection field 52 of the payload data D01, D11 and D21. The first subfields 621e and 621f of the second data protection field 62 of the parity data P01 and P02 are, following the definition of the well-known DPI standard, used to store the CRC obtained by calculating the basic data access unit 61 of the parity data P01 and P11 so as to provide the CRC protection on the basic data access unit 61 of the parity data P01 and P11 during the data transmission on the drive side. The third subfields 623e and 623f of the second data protection field 62 of the parity data P01 and P11 are used to store Ref(P01) and Ref(P11) in the fifth embodiment depicted in FIG. 5E and used to store X-Ref and G-Ref in the sixth embodiment depicted in FIG. 5F, respectively.

Figure 5E:
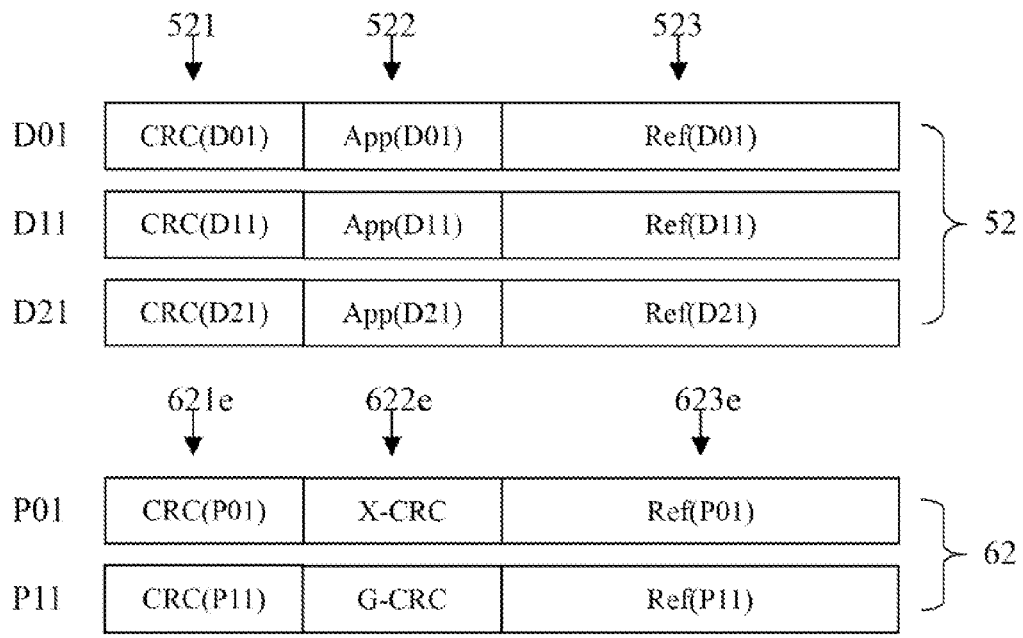

In short, the fifth embodiment depicted in FIG. 5E protects the basic data access units 61 of the parity data P01 and P11 from data errors or address errors during data transmission on the drive side by use of the CRCs stored in the first subfields 621e and the logical block reference tags (Refs) stored in the third subfields 623e. Also, the fifth embodiment provides the CRCs 521 of the first data protection field 52 of the payload data D01, D11 and D21 a RAID data recovery mechanism by use of the second fields 622e. However, this embodiment does not provide the RAID recovery mechanism for the logical block reference tags (Refs) 523 of the first data protection field 52 of the payload data D01, D11 and D21.

Figure 5F:
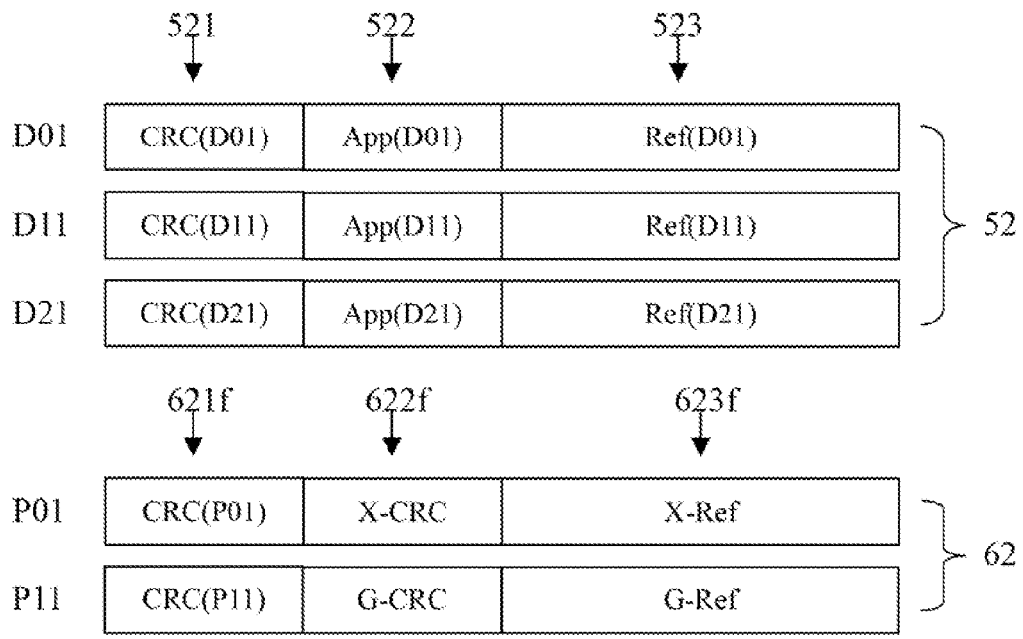

The sixth embodiment depicted in FIG. 5F protects the basic data access units 61 of the parity data P01 and P11 from data errors during data transmission on the drive side by use of the CRCs stored in the first subfields 621f. Also, the fifth embodiment provides the CRCs 521 and the logical block reference tags (Refs) 523 of the first data protection field 52 of the payload data D01, D11 and D21 a RAID data recovery mechanism by use of the second subfield 622f and the third subfield 623f. However, the present embodiment is not able to protect the basic data access unit 61 of the parity data P01 and P11 from address errors during the data transmission on the drive side.

Each embodiment depicted from FIG. 5A to FIG. 5F takes two parity data sets P01 and P02 as an example for the description. However, when a third parity data set P21 is present, the above embodiments can work as well by analogizing the implementation to the third parity data set P21. For example, if a third parity data set P21 (not depicted in the figure) is added to the embodiment of FIG. 5B, the second data protection field 62 of the third parity data set P21 also comprises a first subfield 621b, a second subfield 622b and a third subfield 623b. Wherein, the first and the second subfields 621b and 622b of the parity data P21 are also used to store the check data obtained by calculating the corresponding subfields 521 and 522 of the first data protection field 52 of the payload data D01, D11 and D21 with RAID functions. However the calculation shall be performed according to the corresponding equation of P21 (e.g. $P21=c_0 \cdot D01+c_1 \cdot D11+c_2 \cdot D21$). Thus, a protection with three parity data is provided on the subfields 521 and 522 of the payload data D01, D11 and D21. Following to the embodiment in FIG. 5B, the third subfield 623b of the parity data P21 is also used to store the logical block reference tag (represented as Ref(P21), not shown in FIG. 5B) of the basic data access unit of the parity data P21. Thus, a protection with the logical block reference tag is provided on the basic data access unit of P21 during the data transmission on the drive side.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A redundant data storage system comprising:
   a redundant PSD array comprising a plurality of physical storage devices (PSDs);
   wherein the redundant PSD array is divided into a plurality of stripes each comprising a plurality of payload data chunks and a plurality of parity data chucks, so that the data of at least one basic data access unit of each of the plurality of payload data chunks which are inactive can be rebuilt by an arithmetic process performed on, the plurality of parity data chunks and one or more the payload data chunks which are active;

each of the plurality of payload data chunks and parity data chunks comprises: at least one basic data access unit and at least one data protection field, wherein for each of the plurality of payload data chunks, the data protection field is a first data protection field used to store data protection information comprising a logical block guard subfield, a logical block application tag subfield and a logical block reference tag subfield in order to protect the data stored in the basic data access unit of the payload data chunk; and for each of the plurality of parity data chunks, the data protection field is a second data protection field comprising plural subfields, wherein different combinations of the subfields are used to store a plurality of check data sets in order to protect the data in the data protection field of the payload data chunk.

2. The redundant data storage system of claim 1, wherein the plurality of parity data chunks comprise a first parity data chunk and a second parity data chunk.

3. The redundant data storage system of claim 1, wherein the plural subfields of the second data protection field of each of the plurality of parity data chunks further comprise a first subfield used to store one of the plurality of check data sets, so that the data of the logical block guard subfields of the first data protection fields of any two the payload data chucks which are inactive can be rebuilt by an arithmetic process performed on the first subfields of the second data protection fields of the plurality of parity data chunks and the logical block guard subfield(s) of the first data protection field(s) of one or more the payload data chucks which are active.

4. The redundant data storage system of claim 3, wherein the arithmetic process to rebuild the data of the logical block guard subfields of the first data protection fields of any two the payload data chucks which are inactive involves a Galois Field multiplication process.

5. The redundant data storage system of claim 1, wherein the plural subfields of the second data protection field of each of the plurality of parity data chunks further comprise a second subfield used to store one of the plurality of check data sets, so that the data of the logical block application tag subfields of the first data protection fields of any two the payload data chucks which are inactive can be rebuilt by an arithmetic process performed on the second subfields of the second data protection fields of the plurality of parity data chunks and the logical block application tag subfield(s) of the first data protection field(s) of one or more the payload data chucks which are active.

6. The redundant data storage system of claim 1, wherein the plural subfields of the second data protection field of each of the plurality of parity data chunks further comprise a third subfield used to store one of the plurality of check data sets, so that the data of the logical block reference tag subfields of the first data protection fields of any two the payload data chunks which are inactive can be rebuilt by an arithmetic process performed on the third subfields of the second data protection fields of the plurality of parity data chunks and the logical block reference tag subfield(s) of the first data protection field(s) of one or more the payload data chucks which are active.

7. The redundant data storage system of claim 6, wherein the arithmetic process to rebuild the data of the logical block reference tag subfields of the first data protection fields of any two the payload data chucks which are inactive involves a Galois Field multiplication process.

8. The redundant data storage system of claim 1, wherein the plural subfields of the second data protection field of each of the plurality of parity data chunks further comprise a third subfield used to store one of the plurality of check data sets, wherein the check data set is a logical block reference tag, and the logical block reference tag is the logical block address (LBA) of the PSD corresponding to the basic data access unit of one of the plurality of parity data chunks, in order to protect the data in the basic data access unit of the parity data chunk.

9. The redundant data storage system of claim 1, wherein the plural subfields of the second data protection field of each of the plurality of parity data chunks further comprise a third subfield which is divided into a first space and a second space.

10. The redundant data storage system of claim 9, wherein the first space is used to store a truncated check data set of the plurality of check data sets, the truncated check data set is used to verify the correctness of the deduced data of the logical block reference tag subfield of the first data protection field of the payload data chunk.

11. The redundant data storage system of claim 9, wherein the second space is used to store one of the plurality of check data sets, so that the data of the logical block guard subfields of the first data protection fields of any two the payload data chucks which are inactive can be rebuilt by an arithmetic process performed on the second spaces of the third subfields of the second data protection fields of the plurality of parity data chunks and the logical block guard subfield(s) of the first data protection field(s) of one or more the payload data chucks which are active.

12. The redundant data storage system of claim 11, wherein the arithmetic process to rebuild the data of the logical block guard subfields of the first data protection fields of any two the payload data chucks which are inactive involves a Galois Field multiplication process.

13. The redundant data storage system of claim 11, wherein the plural subfields of the second data protection field of each of the plurality of parity data chunks further comprise a first subfield used to store one of the plurality of check data sets, wherein the check data set is a cyclic redundancy check code (CRC), which is obtained by calculating the basic data access unit of the parity data chunk, in order to protect the data in the basic data access unit of the parity data chunk.

14. The redundant data storage system of claim 9, wherein the second space is used to store one of the plurality of check data sets, wherein the check data set is a cyclic redundancy check code (CRC), which is obtained by calculating the basic data access unit of the parity data chunk, in order to protect the data in the basic data access unit of the parity data chunk.

15. The redundant data storage system of claim 14, wherein the plural subfields of the second data protection field of each of the plurality of parity data chunks further comprise a first subfield used to store one of the plurality of check data sets, so that the data of the logical block guard subfield of the first data protection field of any two the payload data chucks which are inactive can be rebuilt by an arithmetic process performed on the first subfields of the second data protection fields of the plurality of parity data chunks and the logical block guard subfield(s) of the first data protection field(s) of one or more the payload data chucks which are active.

16. The redundant data storage system of claim 15, wherein the arithmetic process to rebuild the logical block guard subfields of the first data protection fields of any two the payload data chucks which are inactive involves a Galois Field multiplication process.

17. The redundant data storage system of claim 1, wherein the plural subfields of the second data protection field of each of the plurality of parity data chunks further comprise a first subfield used to store one of the plurality of check data sets, wherein the check data set is a cyclic redundancy check code (CRC), which is obtained by calculating the basic data access unit of the parity data chunk, in order to protect the data in the basic data access unit of the parity data chunk.

18. The redundant data storage system of claim 17, wherein the plural subfields of the second data protection field of each of the plurality of parity data chunks further comprise a second subfield used to store one of the plurality of check data sets, so that the data of the logical block guard subfields of the first data protection fields of any two the payload data chucks which are inactive can be rebuilt by an arithmetic process performed on the second subfields of the second data protection fields of the plurality of parity data chunks and the logical block guard subfield(s) of the first data protection field(s) of one or more the payload data chucks which are active.

19. The redundant data storage system of claim 18, wherein the arithmetic process to rebuild the logical block guard subfields of the first data protection fields of any two the payload data chucks which are inactive involves a Galois Field multiplication process.

20. The redundant data storage system of claim 18, wherein the plural subfields of the second data protection field of each of the plurality of parity data chunks further comprise a third subfield used to store one of the plurality of check data sets, wherein the check data set is a logical block reference tag, and the logical block reference tag is the LBA of the PSD corresponding to the basic data access unit of the parity data chunk, in order to protect the data in the basic data access unit of the parity data chunk.

21. The redundant data storage system of claim 18, wherein the plural subfields of the second data protection field of each of the plurality of parity data chunks further comprise a third subfield used to store one of the plurality of check data sets, so that the data of the logical block reference tag subfields of the first data protection fields of any two the payload data chucks which are inactive can be rebuilt by an arithmetic process performed on the third subfields of the second data protection fields of the plurality of parity data chunks and the logical block reference tag subfield(s) of the first data protection field(s) of one or more the payload data chucks which are active.

22. The redundant data storage system of claim 21, wherein the arithmetic process to rebuild that data of the logical block reference tag subfields of the first data protection fields of any two the payload data chucks which are inactive involves a Galois Field multiplication process.

23. The redundant data storage system of claim 1, wherein the length of the basic data access unit is 512 bytes.

24. The redundant data storage system of claim 1, wherein the plural subfields of the second data protection field further comprise a first subfield, a second subfield and a third subfield, whose lengths are 2 bytes, 2 bytes and 4 bytes respectively.

25. The redundant data storage system of claim 9, wherein the length of the first space and the second space are 2 bytes and 2 bytes respectively.

26. The redundant data storage system of claim 1, further comprising an array controller coupled to the redundant PSD array, wherein the array controller is used to perform multiplication operations related to the plurality of parity data chunks and a specific value is used to deal with the overflow of the multiplication operations, wherein the specific value is selected from the group consisting of the following values:

| 0x11b | 0x163 | 0x18d | 0x1cf | 0x11d |
| 0x165 | 0x19f | 0x1d7 | 0x12b | 0x169 |
| 0x1a3 | 0x1dd | 0x12d | 0x171 | 0x1a9 |
| 0x1e7 | 0x139 | 0x177 | 0x1b1 | 0x1f3 |
| 0x13f | 0x17b | 0x1bd | 0x1f5 | 0x14d |
| 0x187 | 0x1c3 | 0x1f9 | 0x15f | 0x18b. |

27. The redundant data storage system of claim 1, further comprising an array controller coupled to the redundant PSD array, wherein the array controller is used to perform multiplication operations related to the plurality of parity data chunks by looking up the logarithmic table and/or the antilogarithmic table, and a specific value is used to deal with the overflow of the multiplication operations, wherein the specific value is selected from the group consisting of the following values:

| 0x11d | 0x12d | 0x15f | 0x187 |
| 0x171 | 0x169 | 0x1f5 | 0x1c3 |
| 0x12b | 0x14d | 0x163 | 0x1cf |
| 0x1a9 | 0x165 | 0x18d | 0x1e7. |

* * * * *